United States Patent
Hayashi et al.

[11] Patent Number: 5,918,629
[45] Date of Patent: Jul. 6, 1999

[54] SOLENOID VALVE MANIFOLD WITH SWITCH

[75] Inventors: Bunya Hayashi; Makoto Ishikawa, both of Yawara-mura, Japan

[73] Assignee: SMC Corporation, Tokyo, Japan

[21] Appl. No.: 08/839,372

[22] Filed: Apr. 18, 1997

[30] Foreign Application Priority Data

May 28, 1996 [JP] Japan .................................. 8-156043

[51] Int. Cl.⁶ ............................................... F16K 31/06
[52] U.S. Cl. ........................ 137/560; 137/270; 137/884
[58] Field of Search .................... 137/560, 270, 137/271, 884

[56] References Cited

U.S. PATENT DOCUMENTS

| | | | |
|---|---|---|---|
| 4,378,027 | 3/1983 | Weirich et al. ................. | 137/884 X |
| 5,222,524 | 6/1993 | Sekler et al. ................... | 137/884 |
| 5,222,715 | 6/1993 | Framberg ........................ | 251/267 |
| 5,348,047 | 9/1994 | Stoll et al. .................... | 137/560 X |
| 5,617,898 | 4/1997 | Nagai et al. ................... | 137/884 |
| 5,749,395 | 5/1998 | Hayashi et al. ................. | 137/884 X |

FOREIGN PATENT DOCUMENTS

| | | |
|---|---|---|
| 0 715 108 | 6/1996 | European Pat. Off. . |
| 1 298 800 | 7/1969 | Germany . |
| 404268612 | 9/1992 | Japan ......................... 137/884 |
| 406313488 | 11/1994 | Japan ......................... 137/884 |

*Primary Examiner*—John Rivell
*Attorney, Agent, or Firm*—Oblon, Spivak, McClelland, Maier & Neustadt, P.C.

[57] ABSTRACT

By disposing, at that position of a manifold base 2 that has a solenoid valve 3 mounted thereon that allows external operations, an electric switch 12 for interrupting the power supply to the loaded solenoid valve 3, the solenoid valve 3 can be disconnected from the power supply at the solenoid-valve installation site.

8 Claims, 2 Drawing Sheets

SOLENOID VALVE MANIFOLD WITH SWITCH

FIELD OF THE INVENTION

The present invention relates to a solenoid valve manifold comprising a solenoid valve and a manifold base with the solenoid valve assembled thereon, and in particular, to a solenoid-valve manifold with a switch Including an electric switch capable of turning on and off the supply of electricity to the solenoid.

PRIOR ART

Solenoid valves are generally installed near fluid-pressure equipment and, so as to be convenient to piping and wiring, solenoid valves are often mounted on manifold bases and used as a solenoid-valve manifold. In such a case, a plurality of solenoid valves are mounted on a single manifold base, or a single solenoid valve is mounted on a single divided manifold base and a plurality of manifold bases are connected together, so that a controller can control all the solenoid valves.

If a new solenoid valve or piece of fluid-pressure equipment is installed and connected to each other, or the number of solenoid valves or pieces of fluid-pressure equipment is increased, or a defective solenoid valve or piece of fluid-pressure equipment is replaced, it will be necessary to strictly check whether the newly installed solenoid valve or piece of fluid-pressure equipment operates appropriately. In this case, in terms of safety and operational efficiency, only the solenoid valve to be subjected to maintenance should be disconnected from the power supply to prevent electricity from being supplied thereto in order to check its operating condition under manual operation.

In this manner, specific solenoid valves can be disconnected from the power supply by the controller, but as the controller 1s generally installed away from the solenoid valves, it is inconvenient to have to go to the controller for disconnection each time maintenance is required.

In Japanese Patent Application No. 6-329712, the inventors proposed a solenoid-valve controller including a switch unit that is disposed adjacent to a set of connected solenoid valves and that has switches corresponding to the individual solenoid valves so that the switch can switch each solenoid valve among a state in which the solenoid valve is connected to an output terminal of the controller, a state in which it is connected to a power-supply terminal, and a state in which the supply of electricity is turned off.

This solenoid-valve controller is advantageous in that the switch can turn each solenoid valve on and off at the site to allow the operating conditions of each solenoid valve to be individually checked.

However, since this solenoid-valve controller has a plurality of switches, each corresponding to each solenoid valve and integrated into a single switch unit, the correspondence between the solenoid valves and the switches cannot easily be understood.

In addition, to increase the number of solenoid valves, the number of switches must be increased and added switches must be connected to the corresponding solenoid valves.

DISCLOSURE OF THE INVENTION

It is a main object of this invention to provide a solenoid valve that can be simply and reliably disconnected from a power supply at the solenoid-valve installation site and that can be handled and operated easily.

It is another object of this invention to provide a safe solenoid valve capable of preventing errors in operation and enabling easy switching operations, which allows solenoid valves to be subjected to maintenance to be simply and reliably disconnected from the power supply, even if a plurality of solenoid valves are connected together to form a set of connected solenoid valves, so that all the valves can be controlled simultaneously.

To solve the above problems, this invention provides a solenoid-valve manifold with a switch including, at that position of a manifold base with a solenoid valve mounted thereon that allows external operations, an electric switch for interrupting the supply of power to the solenoid valve.

The solenoid-valve manifold base of the above configuration enables the electric switch provided on the manifold base to be operated so as to simply and reliably disconnect the solenoid valve mounted on the base from the power supply. This eliminates the need to go to a controller for disconnection and allows the solenoid valve to be disconnected at the solenoid-valve installation site, thereby enabling simple and efficient maintenance operations such as operation checks using a manual-operation means.

In addition, by providing an electric switch on the manifold base, normal solenoid valves without an electric switch can be used directly. This is economical because the range of application of the solenoid valves is extended, and thus a solenoid-valve manifold with a switch may be more simply and inexpensively configured than a solenoid valve with a limited structure and size on which a similar switch is provided.

According to this invention, the solenoid valve and the manifold base can be connected by coupling a receiving terminal of the solenoid valve to a feeding terminal of the manifold base, and the feeding terminal is disconnected from the power supply through the use of the electric switch.

This enables the conductivity test of the switch to be conducted from the manifold base during assembly or repair work. Thus, such operations are easy and the conductivity test can be conducted with the solenoid valve removed.

According to one specific embodiment of this invention, the manifold base is configured so as to allow a plurality of solenoid valves to be mounted thereon, and the electric switches are individually disposed in positions corresponding to the solenoid valves.

According to another specific embodiment of this invention, the manifold base is configured as a divided type with a single electric switch, and a plurality of divided manifold bases, each having the solenoid valve mounted thereon, are connected together to constitute a solenoid manifoldbase.

According to this invention, even if a plurality of connected solenoid valves are controlled simultaneously, only the solenoid valves to be subjected to maintenance can be reliably disconnected from the power supply, thereby preventing the switches for the other solenoid valves from being operated.

According to one preferred embodiment of this invention, the electric switch is disposed adjacent to the solenoid-valve mounting section on the top surface of the manifold base.

According to another preferred embodiment of this invention, the electric switch is disposed on the rear end surface of the manifold base.

DETAILED DESCRIPTION OF THE INVENTION

Figure 1:
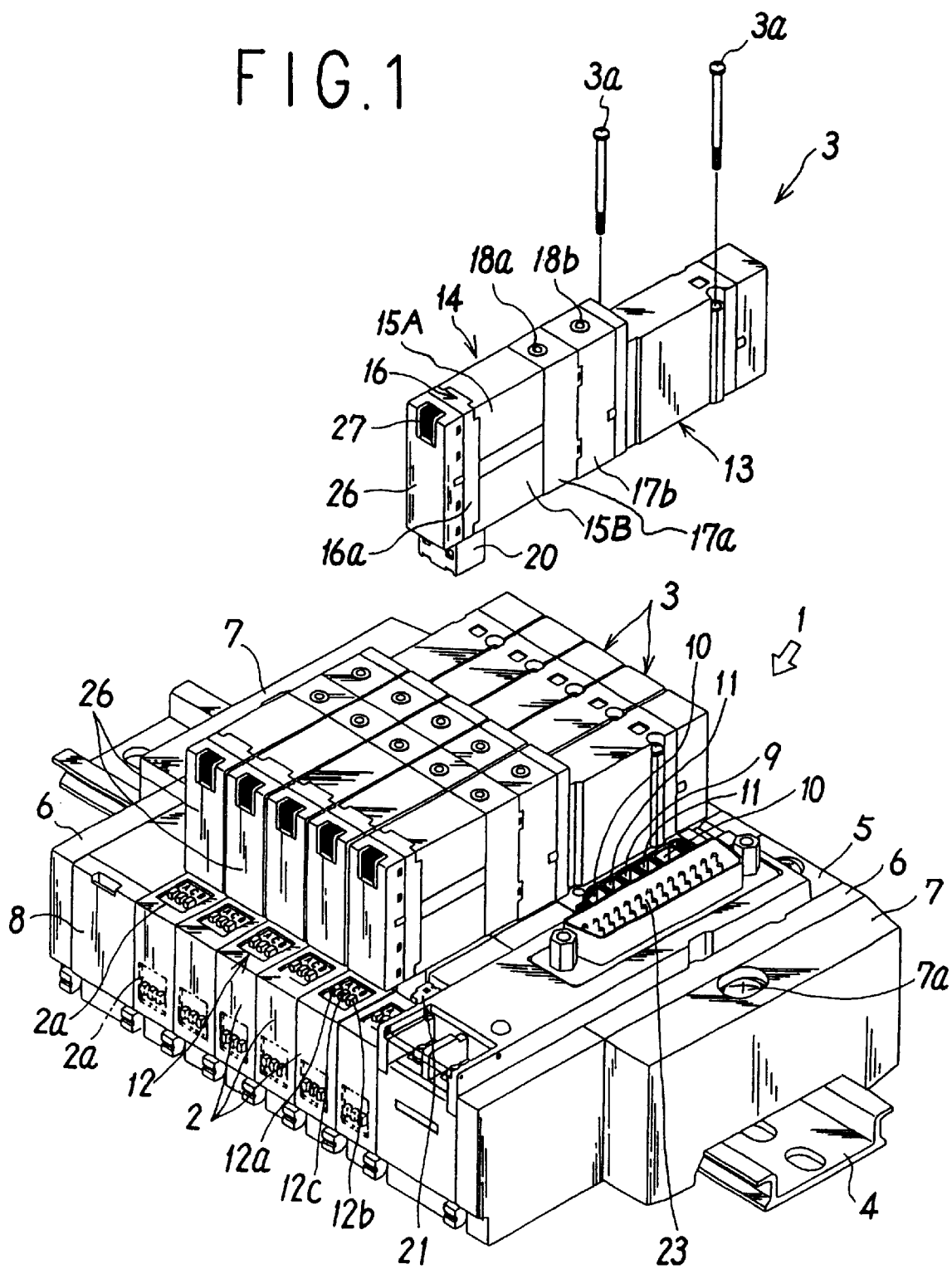
FIG. 1 is a perspective view showing one embodiment of this invention, with one solenoid valve disconnected from the set.

FIG. 1 shows one embodiment of this invention, in which a solenoid-valve manifold according to this embodiment has on a rail 4 a plurality of divided manifold bases 2 that are connected together and that correspond to individual solenoid valves 3, each of which is mounted on each manifold base 2. In addition to the manifold bases 2, a relay block 5, a port block 8, and end plates 6, 6 are mounted on the rail 4, and these components are fixed to the rail 4 by a mounting member 7 mounted on both sides of the components by a mounting screw 7a.

Specifically, the manifold base 2 includes a compressed-air supply channel and two discharge channels (not shown), which penetrate the manifold bases 2 in the connecting direction (the horizontal width direction) and which are in communication with one another in an air-tight manner. The channels are individually in communication with a supply opening 9 and two discharge openings 10, 10 through the solenoid-valve loading section that is the top surface of the manifold bases 2, and with a plurality of ports formed in the port block 8.

The solenoid valve 3 is a double-solenoid pilot type and comprises a main valve section 13 that diverts the flow of compressed air and an electromagnetic operation section 14 to switch the main valve section 13. The electromagnetic operation section 14 includes two pilot valves 15A, 15B vertically disposed therein, and a receiving section 16 to receive electricity for the solenoid valves 15a, 15b in the pilot valves 15A, 15B.

The main valve section 13 includes one compressed-air supply port, two output ports, and two discharge ports (not shown). When the solenoid valve 3 is mounted on the manifold base 2, the supply port communicates with the supply opening 9, and the two discharge ports communicate with the two discharge openings 10, 10. The two output ports also individually communicate with the two output openings 11, 11 in the solenoid-valve 3 loading surface of the manifold base 2 and with the openings in the rear surface of the manifold base 2 through channels formed in the manifold base 2.

The pilot valves 15A, 15B are configured as known three-port valves that are always closed. That is, the pilot valves 15A, 15B include a pilot supply port in communication with the supply channel, a pilot output port to output pilot fluid to the main valve section 13, and a pilot discharge port in communication with one of the discharge channels. When the solenoids 15a, 15b are energized, the pilot supply port and the pilot output port communicate with each other, and when the solenoids 15a, 15b are deenergized, the pilot output port and the pilot discharge port communicate with each other.

Blocks 17a, 17b in the electromagnetic operation section 14 have a first manual-operation means 18a and a second manual-operation means 18b corresponding to the two pilot valves 15A, 15B, respectively. When the solenoids 15a, 15b of the pilot valves 15A, 15B corresponding to the manual-operation means 18a, 18b are in a non-conductive state, the manual-operation means 18a, 18b are pressed to reproduce a switched state that is the same as when the solenoids 15a, 15b are conductive, thereby switching the main valve section 13.

The receiving section 16 has a body 16a mounted on the electromagnetic operation section 14 by a mounting screw; and a receiving connector 20 disposed under the body (on the manifold base side) and having three built-in receiving terminals 20a, 20b, 20c.

On the top surface of the manifold base 2, a feeding connector 21 having three built-in feeding terminals 21a, 21b, 21c extends upward from the solenoid-valve loading section. When the solenoid valve 3 is installed on the solenoid-valve loading section, the receiving and the feeding connectors 20 and 21 are fitted together to electrically connect the receiving terminals 20a, 20b, 20c to the feeding terminals 21a, 21b, 21c.

Figure 2:
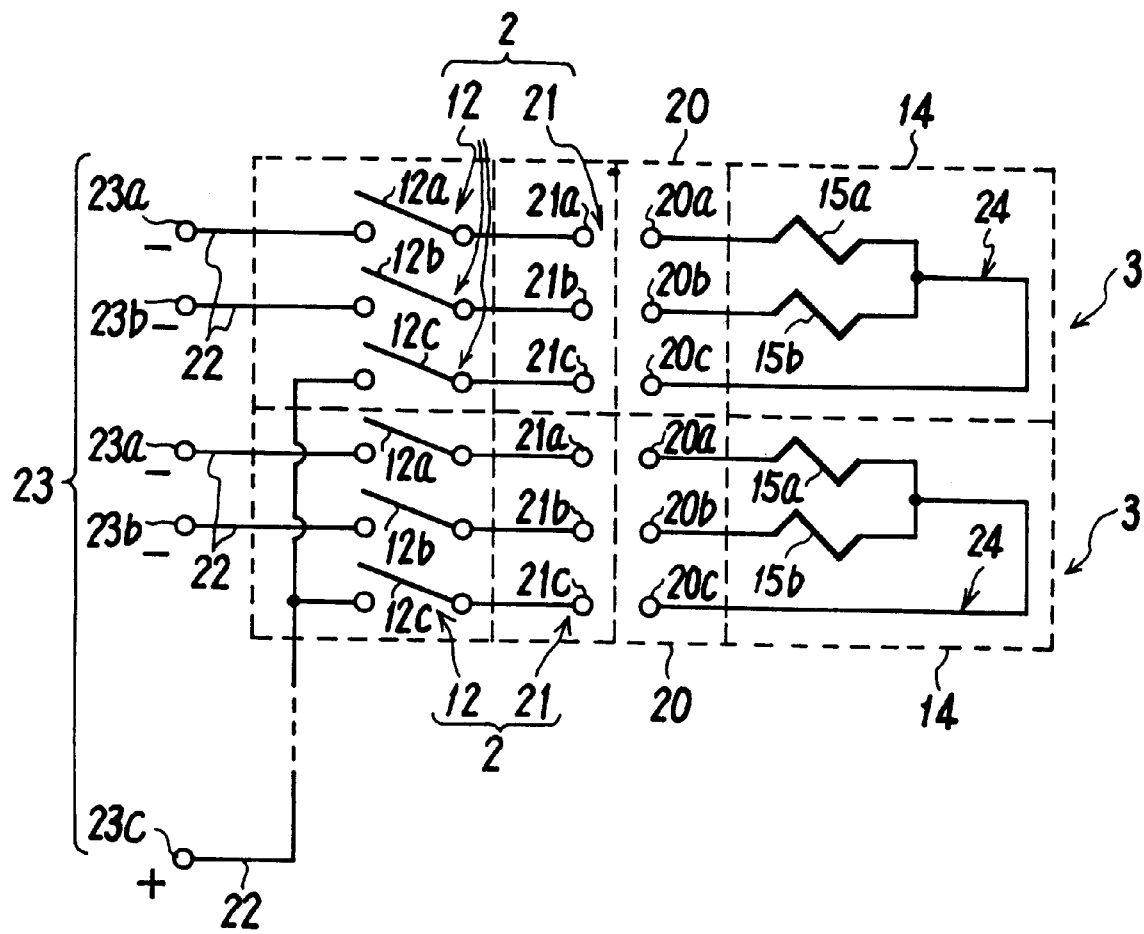
FIG. 2 shows a feeding circuit for the solenoid valves.

The receiving and feeding terminals are each three in number because one end of each of the two solenoids 15a, 15b is connected to the positive pole of the power supply (the controller) via a common feeding terminal 21c, while the other end is connected to the negative pole of the power supply via feeding terminals 21a, 21b, as seen in FIG. 2 showing the feeding circuit.

The feeding circuit incorporates a diode for preventing counter electromotive force or a light-emitting diode indicating the operations of the solenoids, but as they do not relate to the intent of this invention they are not illustrated.

In addition, the relay block 5 includes a relay connector 23 having as many relay terminals 23a, 23b, 23c as feeding terminals 21a, 21b, 21c of all the connected manifold bases 2, and the relay terminals 23a, 23b, 23c are connected to the corresponding feeding terminals 21a, 21b, 21c via an electric switch 12 provided on each manifold base 2.

As the relay terminals 23a, 23b, 23c are connected to the controller, the number of relay terminals 23a, 23b, 23c can be reduced by connecting the feeding terminal 21c of each manifold base 2 to the relay terminal 23c and providing as many relay terminals 23a, 23b as feeding terminals 21a, 21b of the manifold base 2, as shown in FIG. 2.

The electric switch 12 is disposed between the three feeding terminals 21a, 21b, 21c and the relay terminals 23a, 23b, 23c, and three operators 12a, 12b, 12c corresponding to the electric switch 12 are installed within a recess 2a formed adjacent to the solenoid-valve loading section of the top surface of the manifold base 2. The operators 12a, 12b, 12c, however, may be formed on the rear end surface of the manifold base 2, as shown by the chain line.

It is desirable to prevent the operators 12a, 12b, 12c from protruding outward from the recess 2a by increasing the depth of the recess 2a or installing high guide walls around the recess 2a. This can prevent the operators 12a, 12b, 12c from being inadvertently switched, even if a hand or other foreign object contacts the top surface of the manifold base 2.

In the figure, 26 is a cover that covers the receiving section 16 of the solenoid valve 3, 27 is a transparent lighting display window formed in the cover 26 to allow the lighting of the light-emission diode to be checked during the activation of the solenoids 15a, 15b.

In the manifold base of the above configuration, the operators 12a, 12b, 12c of the electric switch 12 mounted on the manifold base 2 can be switched to disconnect the solenoids 15a, 15b of the solenoid valve 3 mounted on the base 2. That is, the solenoids 15a, 15b can be simultaneously turned off by turning off the operator 12c corresponding to the common feeding terminal 21c or the operators 12a, 12b corresponding to the other feeding terminals 21a, 21b, and the solenoid 15a or 15b can be turned off by turning off the operator 12a or 12b. The solenoid valve 3 that has been turned off can then be switched by the manual operation means 18a, 18b to check the operational conditions of the fluid-pressure equipment.

The solenoid valve 3 mounted on the solenoid-valve manifold can be simply and reliably turned on and off by operating the electric switch 12 disposed on the manifold base 2. This eliminates the need to go to the controller for disconnection, and allows the solenoid valve to be disconnected from the power supply at the solenoid-valve installation site. Thus, this disconnection and subsequent maintenance work such as operation checks using the manual-operation means can be simply and efficiently performed through a series of operations.

Even if a plurality of solenoid valves 3 are combined to form a set of connected solenoid valves so that the controller can activate all the solenoid valves simultaneously, as shown in FIG. 1, the electric switches 12 on the manifold bases having thereon the solenoid valves to be subjected to maintenance can be operated so as to reliably disconnect only those solenoid valves, thereby preventing the other solenoid-valve switches from being inadvertently operated. Furthermore, since the electric switch is disposed on the top or rear end surface of the manifold base, the operation of the switch is not interfered with even if a plurality of solenoid valves are connected together in the width direction. The addition of solenoid valves 3 or fluid-pressure equipment is easy compared to the use of a separate switch unit including all the electric switches.

Although in the illustrated embodiment the three electric switches 12 are provided to disconnect the feeding terminals 21a, 21b, 21c from the relay terminals 23a, 23b, 23c, only the two switches 12 for opening and closing the feeding terminals 21a, 21b may be provided by omitting the switch 12 corresponding to the common feeding terminal 21c. Conversely, only one switch corresponding to the feeding terminal 21c may be provided.

In addition, if a plurality of electric switches are provided, a single representative operator may be provided instead of the individual operators to simultaneously open and close the plurality of switches.

Furthermore, although the illustrated embodiment shows a plurality of divided manifold bases that are connected together, a single manifold base may of course be used.

In addition, the manifold base is not limited to a divided type, but may be of a unitary type formed to allow one or more solenoid valves to be mounted thereon. In such a manifold that allows a plurality of solenoid valves to be mounted thereon, the above electric switch is disposed at the position corresponding to each solenoid valve.

The illustrated embodiment has been described in conjunction with the solenoid valve of a double-solenoid pilot 5 port type, but the solenoid valve according to this invention is not limited to this type. It may be a three-or four-port valve. Alternatively, it may be a single-solenoid type. Alternatively, it may be a direct-acting solenoid valve allowing the electromagnetic operation section to directly drive the valve member.

What is claimed is:

1. A solenoid-valve manifold with a switch comprising a solenoid valve to switch a pressurized fluid and a manifold base on which the solenoid valve is mounted, wherein:

said manifold base has at a position that allows external operations an electric switch for interrupting the power supply to the loaded solenoid valve.

2. A solenoid-valve manifold base according to claim 1 wherein:

said solenoid valve and manifold base can be electrically connected by coupling a receiving terminal provided on the solenoid valve to a feeding terminal provided on the manifold base, and wherein said feeding terminal is disconnected from the power supply by said electric switch.

3. A solenoid valve manifold base according to claim 1 or 2 wherein:

a plurality of solenoid valves can be mounted on said manifold base and wherein said manifold base includes said electric switch at the position corresponding to each solenoid valve.

4. A solenoid-valve manifold base according to claim 1 or 2 wherein:

said manifold base is of a divided type that is provided for each solenoid valve so that such manifold bases can be connected together, and each base has a single solenoid valve mounted thereon, and has a single electric switch corresponding to the solenoid valve.

5. A solenoid valve manifold base according to claim 4 including:

a plurality of divided manifold bases, each having a single solenoid valve mounted thereon; and a relay block to feed electricity to all the solenoid valves simultaneously, wherein the relay block has a relay terminal that can be connected to the power supply and that is connected to a feeding terminal of each manifold base.

6. A solenoid-valve manifold base according to claim 1 or 2 wherein:

said electric switch is provided adjacent to a solenoid-valve loading section on the top surface of the manifold base.

7. A solenoid-valve manifold base according to claim 1 or 2 wherein:

said electric switch is provided on the rear end surface of the manifold base.

8. A solenoid-valve manifold base according to claim 1 or 2 wherein:

said solenoid valve has a manual-operation means that allows manual switching operations.

* * * * *